3,296,178
AGGLOMERATION OF SYNTHETIC
RUBBER LATEX
John D. Sutherland, Jr., Baton Rouge, La., assignor to Copolymer Rubber & Chemical Corporation, a corporation of Louisiana
Filed Aug. 23, 1957, Ser. No. 679,849
4 Claims. (Cl. 260—29.7)

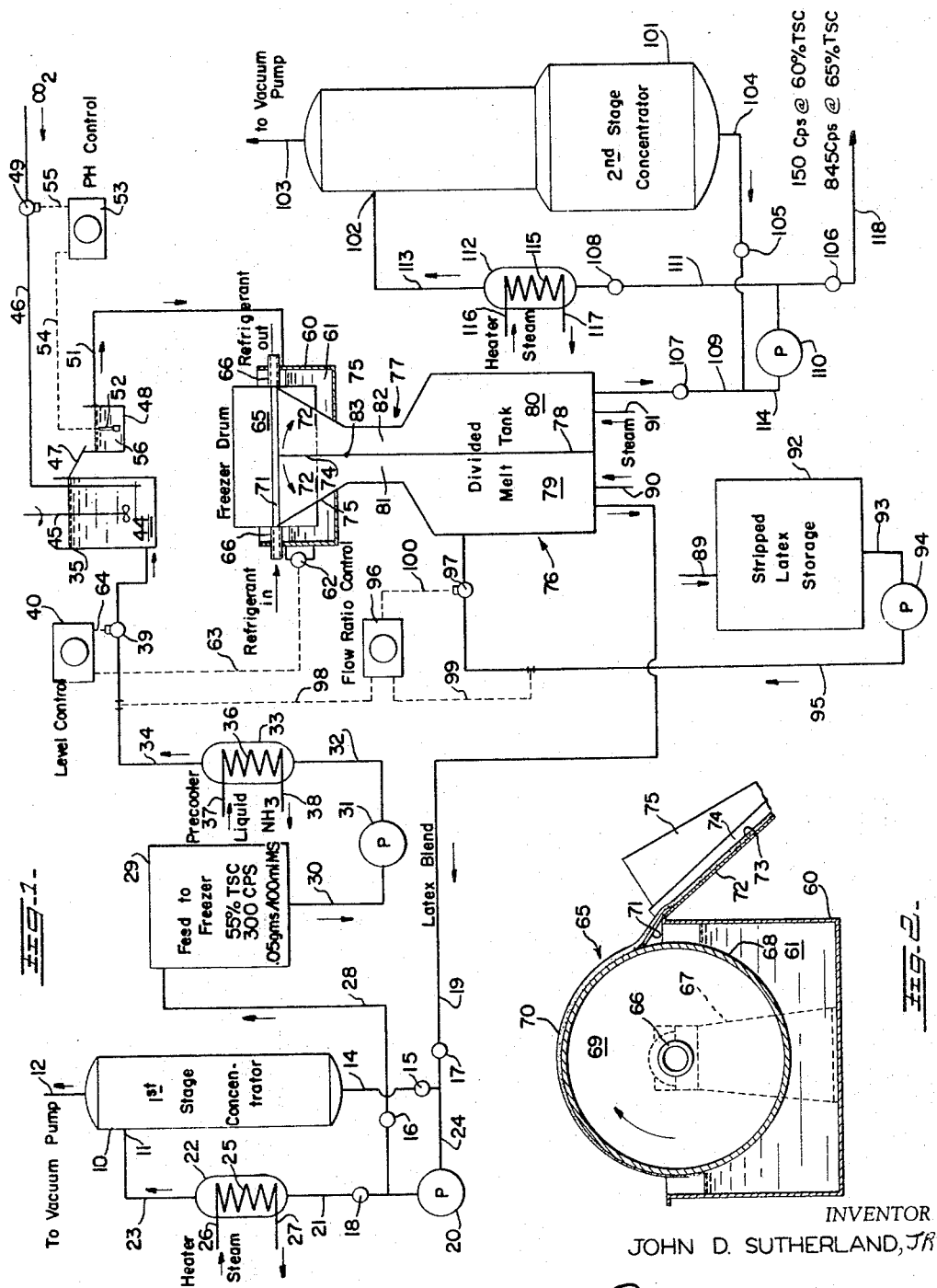

This invention broadly relates to a novel low temperature process for the agglomeration of synthetic rubber latex. In some of its more specific aspects, the invention further relates to a novel process for improving the mechanical stability of synthetic rubber latex, and to the agglomeration and concentration of synthetic rubber latex, such as conventional low solids relatively small average particle size synthetic rubber latex. The invention also relates to the preparation of low viscosity high solids synthetic rubber latex.

In many industrial processes using synthetic rubber latex, such as in the manufacture of foam rubber, it is desirable that the synthetic rubber latex have certain properties, among the more important being a high solid content, such as about 60% TSC or higher, and a low viscosity such as less than about 1000 centipoises at 60% TSC. In general, within reasonable limits, the higher the solids content and the lower the viscosity, the more desirable the synthetic rubber latex. Still another important consideration is the mechanical stability of the synthetic rubber latex. If the latex does not exhibit satisfactory mechanical statbility properties, then a substantial portion of the latex will irreversibly coagulate during handling and storage prior to use, i.e., form "prefloc," which is very undesirable.

The viscosity of synthetic rubber latex at a given temperature and solids content is largely determined by the average particle size and the distribution of particle size. It is generally accepted in the art that a large average particle size and a wide uniform distribution of particle size are desirable and result in a lower viscosity synthetic rubber latex at a given solids content and temperature. As the solids content is increased, the viscosity of a synthetic rubber latex of a given average particle size and distribution of particle size increases, and particularly at higher solids content.

Many attempts have been made to prepare satisfactory low viscosity high solids synthetic rubber latices. One of the more common processes has involved emulsion polymerization in an aqueous medium of suitable monomers, with or without suitable comonomers, using a recipe for high solids content. The quantity of water used in such a recipe is kept at a minimum, as are the number of soap micelles serving as centers of polymerization. Thus, a relatively small number of particles of polymer are activated and the end result is an increase in the average particle size of the resulting synthetic rubber latex. This procedure is not satisfactory for a number of reasons, among the more important being the extremely long reaction time required and the difficulty of controlling the temperature, reaction rate and viscosity during polymerization. In addition, the viscosity of the end latex product is relatively high in many instances and a uniform low viscosity high solids latex product is difficult to prepare on a commercial scale.

Starting soon after World War II, processes have been developed for the agglomeration of low solids small average particle size latex. While low solids small average particle size latex may not be concentrated to over about 35–45% TSC without encountering extremely high viscosities and prohibitive amounts of prefloc, the same latex after agglomeration may be concentrated to somewhat higher solids content. Since a low solids small average particle size synthetic rubber latex may be prepared using a conventional fast reaction recipe at low solids content in only a fraction of the reaction time required for polymerization when using a recipe at high solids content and without the attendant production problems, such processes have been of considerable interest to the art.

One of the more satisfactory low temperature processes for the agglomeration of low solids synthetic rubber latex is one in which a specific low solids GR–S latex is agglomerated by reducing the pH with carbon dioxide and then subjecting the latex to a freezing action for a short period of time at a temperature only moderately below the apparent freezing point of the latex, such as at about 10° F. The agglomerated GR–S latex thus produced may be concentrated to produce a high solids latex of reasonable viscosity. If it is desired to further agglomerate the latex and to further improve the viscosity characteristics, the once frozen and thawed concentrated latex is refrozen and reconcentrated.

In attempting to adapt this process to the commercial production of low viscosity high solids synthetic rubber latices, it was found that many disadvantages and problems are presented which result in an overall unsatisfactory process. For example, the once frozen and thawed latex product at 60% TSC or higher tended to exhibit an undesirably high viscosity. Even more important, when attempts were made to reduce the viscosity by refreezing and rethawing the once frozen and thawed latex it was found that the stability was such, even when using relatively large amounts of emulsifier, that excessive amounts of prefloc formed during refreezing and rethawing. This made the process uneconomic in both utilization of the monomers and emulsifier, and in the necessity for frequent cleaning of apparatus to remove prefloc. In addition, the viscosity of the end latex product at a given solids content could not be controlled effectively and it was impossible to produce continuously a high solids latex having a uniform viscosity.

A low solids small average particle size synthetic rubber latex may be agglomerated to a relatively large average particle size and then concentrated to produce a low viscosity high solids synthetic rubber latex while overcoming the above mentioned problems and disadvantages by a process which may comprise the steps of concentrating a blend of frozen and thawed agglomerated synthetic rubber latex having a relatively large average particle size and synthetic rubber latex having a relatively small average particle size in a first concentration step, agglomerating the synthetic rubber latex blend to a relatively large average particle size by subjecting the same to a freezing action at a temperature moderately below the apparent freezing point, thawing the frozen agglomerated synthetic rubber latex blend, blending a portion of the frozen and thawed agglomerated synthetic rubber latex blend with low solids synthetic rubber latex having a relatively small average particle size in quantities such as to produce a synthetic rubber latex blend of improved mechanical stability, passing at least a portion of the resulting synthetic rubber latex blend to the first concentration step, and then concentrating a portion of the frozen and thawed agglomerated synthetic rubber latex blend in a second concentration step to a desired solids content.

While the above process will produce a highly satisfactory low viscosity high solids latex where a temperature is near the apparent freezing point of the emulsion, the process is unsatisfactory in certain respects as will be explained more fully hereinafter due to, among other things, inefficient agglomeration as compared with agglomeration in accordance with the present invention.

It is an object of the present invention to provide an improved low temperature process for the agglomeration of synthetic rubber latex.

It is a further object of the present invention to provide an improved process for agglomerating and concentrating a small average particle size low solids synthetic rubber latex to produce low viscosity high solids synthetic rubber latex therefrom.

It is a further object of the present invention to provide a novel process for improving the mechanical stability of synthetic rubber latex and for preparing a synthetic rubber latex blend of improved mechanical stability.

It is a further object of the present invention to provide an improved low temperature process for the agglomeration of synthetic rubber latex wherein the agglomerating action is enhanced.

It is a further object of the present invention to provide an improved process for the agglomeration of synthetic rubber latex by a low temperature process in which the agglomerated latex is more readily handled.

Still other objects of the present invention and the attendant advantages thereof will be apparent to those skilled in the art by reference to the following detailed description and the drawings, wherein:

FIG. 1 diagrammatically illustrates one suitable arrangement of apparatus for essentially continuous operation in accordance with the invention; and FIG. 2 is an enlarged side view in section of a freezer drum and freezer drum tank suitable for the freezing of latex in accordance with the invention.

Referring now to FIG. 1, the first stage concentrator 10 is a conventional concentrator of a type suitable for thermally concentrating synthetic rubber latices. The first stage concentrator, for example, may be of the essentially batch-type, as illustrated in the drawings, wherein the concentrator is charged batchwise with low solids latex, the latex charge recycled until concentrated to a desired higher solids content, and then the higher solids latex withdrawn batchwise from the concentrator; or the first concentration step may be of the essentially continuous-type wherein a stream of low solids latex is fed continuously at a controlled rate to a concentrator, the contents of the concentrator continuously recycled and a side stream of higher solids latex is withdrawn continuously from the concentrator at a controlled rate. The first stage concentrator 10 is provided with a feed inlet 11 in the upper portion thereof, an exhaust conduit 12 leading from the top of the concentrator to an exhaust means such as a vacuum pump (not shown), and a conduit 14 provided with valve 15 for withdrawing the contents. When charging the first stage concentrator 10, the valves 15 and 16 are closed, and valves 17 and 18 are opened. A synthetic rubber latex blend is passed via conduit 19 to pump 20, and then forced by means of pump 20 through conduit 21, heater 22, conduit 23 and feed inlet 11 into first stage concentrator 10. After introducing the desired quantity of latex blend into first stage concentrator 10, valve 17 is closed, valve 15 opened and the latex charge continuously recycled through conduit 21, heater 22, conduit 23, first stage concentrator 10, conduit 14 and portion 24 of conduit 19 by means of pump 20 until concentrated to a desired dry solids content. During the recycling step, a suitable heating fluid such as steam is supplied to and withdrawn from coil 25 in heater 22 by conduits 26 and 27, respectively, thereby continuously heating the latex blend. Also, first stage concentrator 10 is maintained under a suitable reduced pressure such as 28 inches of mercury vacuum by suction on exhaust conduit 12, thus allowing a portion of the volatile contents (largely water) to evaporate. The vapors are withdrawn from the system via exhaust conduit 12. When the latex blend is concentrated to a desired dry solids content, such as about 55% TSC, valve 18 is closed, valve 16 is opened and the latex charge is withdrawn and transferred by means of pump 20 via conduit 28 to freezer feed tank 29.

The latex from the first concentration step is passed from freezer feed tank 29 via conduit 30 to pump 31, and forced by means of pump 31 through conduit 32, precooler 33 and conduit 34 into the lower portion of pH adjustment tank 35. A suitable cooling fluid such as liquid ammonia is supplied to and withdrawn from coil 36 in precooler 33 by conduits 37 and 38, respectively, for the purpose of precooling the latex to a desired temperature such as about 40° F. and thereby lowering the refrigerant requirement in the freezing apparatus to be described hereinafter. The flow rate of latex through conduit 34, i.e., the latex feed rate to tank 35, is controlled by means comprising level control valve 39 which is operated by level controller 40.

The pH adjustment tank 35 is provided with an agitator 45, conduit 46 and overflow spout 47 leading to container 48. Usually the pH of the latex feed to tank 35 is about 10 and the stability characteristics are such that the latex 44 in tank 35 should be destabilized sufficiently by a suitable method, such as by adjustment of pH, for more effective agglomeration by a freezing process. A suitable acidic substance such as carbon dioxide is fed via conduit 46 into the latex 44 contained in the lower portion of tank 35 at a feed rate controlled by means of control valve 49, the feed rate being such as to effect adjustment of the pH to a desired predetermined value such as 7.8 to 8.5. The carbon dioxide is added in a quantity sufficient to adjust the pH to a desired value, i.e., in a quantity such as to destabilize the latex sufficiently to result in effective agglomeration upon freezing, but not in an amount or manner such as to cause the formation of an objectionable amount of prefloc.

The container 48 is provided with an overflow conduit 51 and a pH electrode 52 positioned so as to be immersed in the latex 56. A pH controller 53 is operatively connected in a conventional manner with pH electrode 52 and control valve 49 by means of connections 54 and 55, respectively, for the purpose of measuring the pH of the latex overflowing from tank 35 and operating control valve 49 in response to changes in pH of the overflowing latex, thereby controlling the feed rate of substance within conduit 46 and in this manner maintaining the pH at a desired value.

After adjustment of pH, the latex is passed via conduit 51 to freeze drum tank 60. The latex 61 contained in freezer drum tank 60 is maintained at a desired operating level by means comprising level controller 40. The level controller 40 is operatively connected in a conventional manner with latex level sensitive means 62 and control valve 39 by means of connections 63 and 64, respectively, and operates control valve 39 in response to changes in the level of latex within freezer drum tank 60. Inasmuch as the feed rate of latex to freezer drum 60 is determined by the rate of overflow from container 48, which in turn is determined by the rate of overflow from and the feed rate to tank 35, it is apparent that the latex level to freezer drum 60 may be readily controlled in this manner.

As best seen in FIG. 2, a freezer drum 65 is rotatably mounted in freezer drum tank 60 on hollow trunnions 66 supported by trunnion support means 67. It will be noted that the freezer drum 65 is so mounted in freezer drum tank 60 as to be partially submerged in latex 61. In addition to performing their usual function, as diagrammatically illustrated in FIG. 1, the hollow trunnions 66 serve as conduits for the passage of a suitable refrigerant such as liquid ammonia through the interior of freezer drum 65. Referring again to FIG. 2, with reference to the temperature of operation when following previously suggested practice for the agglomeration of latex by a freezing process, the rotating outer freezer drum surface 68 is maintained by means of refrigerant supplied to the drum interior 69 at a temperature sufficiently low so as to collect a film of latex 70 by a freezing action, but with the temperature being sufficiently high to prevent subcooling of the collected latex film to a temperature appreciably below its freezing point. As the freezer drum 65 rotates in a clockwise direction, the collected film of latex 70 which has been agglomerated to some extent by the freezing action is removed by scraper 71 and deposited upon surface 72. It will be noted that the agglomerated latex 73 thus removed is divided into two portions by means of divider blade 74 and is then guided downward along surface 72 by means of baffles 75 and divider blade 74.

Referring now to FIG. 1, the melt tank 76 is provided on its upper end with chute 77. The surface 72 and baffles 75 are joined at their lower ends to the upper end of chute 77 thereby providing means for transferring the agglomerated latex from the scraper 71 to the melt tank 76. A partition 78 divides melt tank 76 into two compartments 79 and 80 and chute 77 into two chute portions 81 and 82. The lower portion of divider blade 74 is attached to the upper portion of partition 78 by a hinged connection 83, thereby allowing divider blade 74 to be adjusted to any point along scraper 71. This arrangement provides for the division and transfer of any desired proportion of the agglomerated latex to either compartment of melt tank 76.

A suitable heating medium such as steam is supplied to the bottom of compartments 79 and 80 via conduits 90 and 91, respectively, for thawing the agglomerated latex therein. The storage tank 92 is provided with an inlet conduit 89 leading to a source (not shown) of synthetic rubber latex having a relatively small particle size. A latex blend of agglomerated latex having a relatively large average particle size and latex having a relatively small particle size is continuously prepared in compartment 79 by withdrawing stripped latex having a relatively small average particle size from storage tank 92 via conduit 93 and forcing the same by means of pump 94 via conduit 95 into compartment 79 where it is blended with the agglomerated latex having a relatively large particle size. The flow ratio controller 96 is operatively connected in a conventional manner with conduit 34, conduit 95 and control valve 97 by connections 98, 99 and 100, respectively, and operates control valve 97 in response to changes in the rate of flow in conduit 34 to thereby maintain the desired flow ratio within conduits 34 and 95, and in this manner continuously prepare a latex blend having a desired ratio of the agglomerated latex to the stripped latex.

The second stage concentrator 101 is a conventional concentrator of a type suitable for thermally concentrating synthetic rubber latices to a high solid content. The general construction and operation of second stage concentrator 101 may be substantially the same as described hereinbefore for first stage concentrator 10. The second stage concentrator 101 is provided with a latex feed inlet 102 in the upper portion thereof, an exhaust conduit 103 leading from the top of the concentrator to exhaust means such as a vacuum pump (not shown) and a conduit 104 provided with valve 105 for withdrawing the contents. When charging the second stage concentrator 101, the valves 105 and 106 are closed, valves 107 and 108 opened, and agglomerated latex having a relatively large average particle size is withdrawn from compartment 80, passed via conduit 109 to pump 110, and then forced by means of pump 110 through conduit 111, heater 112, conduit 113 and feed inlet 102 into second stage concentrator 101. After introducing the desired quantity of agglomerated latex into second stage concentrator 101, valve 107 is closed, valve 105 is opened, and the latex charge continuously recycled through conduit 111, heater 112, conduit 113, second stage concentrator 101, conduit 104 and portion 114 of conduit 109 by means of pump 110 until concentrated to a desired dry solids content. During the recycling step, a suitable heating fluid such as steam is supplied to and withdrawn from coil 115 in heater 112 by conduits 116 and 117, respectively, thereby continuously heating the latex. Also, second stage concentrator 101 is maintained under a suitable reduced pressure such as 28 inches of mercury vacuum by suction on exhaust conduit 103, thus allowing a portion of the volatile contents (largely water) to evaporate. The vapors are withdrawn from the system via exhaust conduit 103. When the latex is concentrated to a desired solids content, such as about 60 to 65% TSC, valve 108 is closed, valve 106 opened, and the final latex product is withdrawn via conduit 118.

When agglomerating synthetic rubber latex by a low temperature process in accordance with prior art practice, it was taught that, in order to prevent irreversible coagulation, the latex must be subcooled to a temperature only moderately below its freezing point, i.e., to a temperature only moderately below about 28° F. It was further taught that temperatures as high as −6° F. always caused irreversible coagulation of the latex and thus were to be avoided. In accordance with these teachings, the freezer drum 65 was operated in such a manner that the collected latex film 70 was subcooled at the time of removal by scraper 71 to a temperature only moderately below the freezing point of the latex, such as about 10° F. Under these conditions it was extremely difficult to operate the freezer drum 65 and associated apparatus. For example, the collected latex film 70 was found to cling so tenaciously to the freezer drum surface 68 that excessive power requirements were necessary to drive the freezer drum 65. Also, the freezer drum 65 rotated with an uneven, jerking motion which caused the scraper 71 to gouge into the drum surface 68, as well as causing metal fatigue and eventual failure. In attempting to overcome these mechanical difficulties, it was discovered that although the collected latex film 70 at the time of removal by scraper 71 gave the appearance of being completely frozen, it actually contained unfrozen latex present in interstices within the collected latex film 70. It was further discovered that although this unfrozen latex had been subjected to the same temperature as the remainder of the collected latex film 70, it was not agglomerated to an appreciable extent and thus the overall agglomeration step was not efficient. In addition to the mechanical operating difficulties and inefficient agglomeration, handling difficulties also were present since the particles of collected latex 73 removed by scraper 71 tended to be tacky and could not be passed readily along surfaces 72 and chute portions 81 and 82 to compartments 79 and 80, respectively. It was further discovered that the above mentioned difficulties could be overcome and the agglomeration step made more efficient by operating the freezer drum 65 at substantially lower temperatures than heretofore thought possible, and that when operating under such temperature conditions, the latex was not irreversibly coagulated. In fact, the amount of prefloc formed during the freezing step when operating in accordance with the present invention was substantially the same as when operating at higher temperatures.

In accordance with the present invention, the freezer drum 65 is operated in such a manner as to collect a latex film 70 by a freezing action on the freezer drum surface 68, and then the collected latex film 70 is subcooled to a temperature substantially below the freezing point of the latex i.e., substantially below about 28° F., and to a temperature sufficiently low to completely freeze and embrittle the latex. This may be accomplished by maintaining the freezer drum surface 68 at such a temperature and at such a speed of rotation that the collected latex film 70 is subcooled to a desired low temperature before removal by scraper 71. Good results are obtained when a substanital portion of the collected latex film 70 is subcooled prior to removal by scraper 71 to a temperature less than −10° F., but temperatures much lower than −10° F. may be used. For example, temperatures as low as −40° F. may be used satisfactorily. Usually superior results will be obtained when a major portion of the collected latex film 70 is subcooled to a temperature between about −10° F. and −27° F. Extremely good results can generally be obtained with the outside surface of the film at a temperature of about −17° F.

The present invention provides a process for agglomerating small particle size latex into a latex product having larger average particle size than product which has previously resulted from latex agglomerated by freezing action. This larger average particle size latex produced in accordance with the present invention has greater mechanical stability. Also, in using the low temperatures of the present invention, the film of latex frozen on the moving surface is embrittled and can therefore be readily removed without mechanical difficulties. The foregoing are advantages of an unobvious nature which make the present invention of great practical value in a single freezing step process. On the other hand, in the environment of the specific process disclosed in the present application, the exceedingly low freezing temperatures of the present invention have an especial advantage in addition to those enumerated. Since small particle size latex on being subjected for the first time to freezing action under the low temperatures of the present invention is agglomerated to a larger particle size than in processes disclosed in the prior art, agglomerated latex recycled in the process disclosed in the present application has a larger average particle size. As a result the first concentration step is acting upon a latex of larger average particle size and the refreezing of the recycled latex is again acting on a larger average particle size latex. It will be apparent that the results of the first freezing step, the first concentration step and the repeated freezing of this larger particle size latex, and even including the second stage concentration step, are all cumulative in their effect. The well known phenomenon of larger particle size latex agglomerating more rapidly than small particle size latex is thus an agent in the present invention for producing a latex blend and a final latex product of extremely large average particle size never before produced.

The refrigerant supplied to freezer drum 65 via trunnions 66 may be liquefied ammonia when using the preferred range of temperature. However, particularly when a lower temperature is desired, a refrigerant such as a suitable liquefied gaseous hydrocarbon, e.g., methane, ethane, propane, and mixtures thereof, or other suitable refrigerants, may be used. When operating the freezer drum 65 to obtain the preferred temperature range, it is usually preferred to rotate the freezer drum 65 at such a speed that the collected latex film 70 is about 1/16 to 1/8 inch in thickness. When the collected latex film 70 is of such a thickness, then it may be readily subcooled to a desired temperature such as −10° F. to −27° F. in a period of time substantially less than one minute and usually within about 20–40 seconds. Thus, usually when the freezer drum 65 has a diameter of about 4 feet, then the speed of rotation may be about 1 to 2.5 r.p.m.'s when the temperature of the freezer drum surface 68 is about −18° F. or lower.

While an essentially continuous process is illustrated in the drawings and specifically described herein, it is also possible to use a batch process, or to perform one or more of the various steps of the continuous process on a batch basis such as, for example, pH adjustment, preparation of the synthetic rubber latex blend, or agglomeration of the synthetic rubber latex blend. It also may be convenient in some instances to effect division of the frozen synthetic rubber latex by using two substantially identical freezer drums and melt tanks so arranged that the frozen latex from one drum may be passed to one melt tank and used to prepare the synthetic rubber latex blend for feed to the process, and the frozen synthetic rubber latex from the other drum may be passed to the other melt tank and used as feed to the second stage concentrator. Still other modifications of the process of the invention other than those specifically set forth above are possible without departing from the invention and will be apparent to those skilled in the art.

The synethic rubber latices to be processed in accordance with the invention may be prepared by conventional processes well known in the art such as, for example, conventional processes wherein polymerizable monomeric compounds are emulsified in an aqueous medium by means of an emulsifying agent such as a soap or other suitable surface active agent, and the polymerization made to take place at a suitable controlled temperature in the presence of a suitable catalyst and/or other regulating materials. The primary emulsifier preferably should be a long chain fatty acid soap for best results such as sodium or potassium oleate rather than the rosin soaps. The polymerization is generally "short-stopped" at a suitable stage before complete conversion, such as at about 60% conversion, and the unreacted monomer or monomers removed by conventional flashing and/or stripping. As is well understood in the art, it is also advantageous in the preparation of certain synthetic rubber latices, such as GR–S latices, to carry out the polymerization at a low temperature such as about 41° F.

Examples of polymerizable materials for use in preparing synthetic rubber latices are the various 1,3-butadienes such as 1,3-butadiene, methyl-2-butadiene-1,3-piperylene, and 2,3-dimethyl-butadiene-1,3. If desired, the polymerizable material may be a mixture of a 1,3-butadiene, such as 1,3-butadiene, with another polymerizable compound which is capable of forming rubbery copolymers with 1,3-butadienes. For example, such polymerizable mixtures may contain up to 50% (or higher in some instances) of a compound which contains a $CH_2=C=$ group wherein at least one of the disconnected valences is attached to an electroactive group, i.e., a group which substantially increases the electrical dissymmetry or polar character of the molecule. Examples of compounds containing the aforementioned group and copolymerizable with the 1,3-butadienes are the aryl olefins, such as styrene and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene; methyl vinyl ether; and methyl vinyl ketone. Synthetic rubber latices prepared from polymerizable materials described herein may be referred to in the claims as being synthetic rubber latices of the group consisting of latices of rubbery homopolymers of conjugated diolefins and latices of rubbery copolymers of conjugated diolefins and monoethylenically unsaturated monomers. The preferred polymerizable material is a mixture of butadiene and styrene wherein the styrene content of the mixture, by weight, is less than about 50%. A typical recipe in parts by weight for preparing a butadiene-styrene synthetic rubber latex for use in the present invention is given below in Table I.

TABLE I

| | |
|---|---|
| Butadiene | 100–50 |
| Styrene | 0–50 |
| Potassium or sodium oleate | 1.5–5.0 |
| Electrolyte [1] | 0.2–1.5 |
| Secondary emulsifier [2] | 0–1.5 |
| Ethylenediamine tetraacetic acid tetra sodium salt [3] (in soap solution) | 0–0.10 |
| Sodium hydrosulfite | 0–0.10 |
| Water | 150–250 |
| Sodium formaldehyde sulfoxylate | 0.04–0.20 |
| Diisopropylbenzene hydroperoxide or paramethane hydroperoxide | 0.05–0.30 |

TABLE I—Continued

Tertiarydodecylmercaptan _____ 0–0.3
Ferrous sulfate heptahydrate _____ 0.02–0.04
Versene 100 to complex ferrous sulfate _____ 0.03–0.60
Shortstop _____ 0.05–0.20

[1] The following electrolytes or mixtures of any two may be used: Potassium chloride, sodium chloride, trisodium phosphate, tripotassium phosphate, potassium pyrophosphate, potassium sulfate, sodium sulfate, sodium borate and lithium chloride.
[2] Tamol N, Daxad 11, Nycol (polymerized sodium salts of alkyl naphthalene sulfonic acid).
[3] Sold as Versene 100, a product of Dow Chemical Company; Sequestrene 30A, a product of Alrose Chemical Company; Nullapon BF–13, a product of Antara Chemicals.

The stripped synthetic rubber latex in storage tank 92 may be a conventional synthetic rubber latex having a relatively small average particle size as compared with the average particle size of the frozen and thawed agglomerated synthetic rubber latex. The stripped synthetic rubber latex in storage tank 92 may contain about 18–20% solids, e.g., the latex may have a solids content as present in the original latex withdrawn from conventional polymerization reactors (60% conversion) and after flashing and/or stripping. However, the latex may be concentrated, if desired, to a higher solids content such as 35–45%. It usually is not possible to concentrate small particle size synthetic rubber latex to a higher concentration. By first concentrating the stripped 18–20% synthetic rubber latex to about 35–45% TSC, the amount of water to be removed in the first concentration step is reduced and thus the load on first stage concentrator 10 will not be as great. However, no appreciable advantage is obtained by first concentrating the latex within storage tank 92 provided the capacity of first stage concentrator 10 is sufficiently high.

When it is desired to reduce and control the viscosity of the final latex product and to stabilize the latex feed to the first concentration step of the continuous process, it is essential that the synthetic rubber latex blend described herein be supplied as the feed to first stage concentrator 10. For example, if an attempt is made to recycle only frozen and thawed latex, the stability characteristics of the latex feed are such that prohibitive amounts of prefloc will be formed during the recycling process. Should an attempt be made to prepare low viscosity high solids synthetic rubber latex by a "once through" process using only small average particle size latex as the feed, i.e., by first stage concentration of the small average particle size latex 35–45% TSC, pH adjustment, agglomeration by freezing, thawing and then concentrating the resulting once-frozen and once-thawed latex, it is impossible to prevent a large amount of prefloc from forming. Also, the end latex product has a relatively high viscosity, the viscosity of the product cannot be controlled, and it is not possible to obtain the extremely wide and uniform distribution of particle size characteristic of the final latex product prepared by the continuous process described herein.

The synthetic rubber latex blend described herein must contain frozen and thawed agglomerated synthetic rubber latex having a relatively large average particle size and synthetic rubber latex having a relatively small average particle size, with the agglomerated latex being present in a quantity such as to produce a synthetic rubber latex blend of improved mechanical stability. Some improvement is noted in blends containing amounts as small as about 5 parts by weight (on a dry solids basis) of the agglomerated synthetic rubber for each 100 parts of the synthetic rubber latex blend, and amounts up to about 85 parts by weight may be used. However, better results are obtained when the latex blend comprises by weight and on a dry solids basis about 35–65 parts of the agglomerated synthetic rubber latex for each 100 parts of synthetic rubber latex blend, with the best results usually being obtained with about one part of the frozen and thawed agglomerated latex for each part of the synthetic rubber latex having a relatively small average particle size. Such blends of synthetic rubber latices exhibit a greatly improved mechanical stability which is not fully explainable at the present time, and which is apparently due to some synergistic effect. The synthetic rubber latex blends referred to herein, unless otherwise indicated, are by weight and on a dry solids basis.

The process of the present invention is particularly useful for the economical production of low viscosity high solids synthetic rubber latices by the continuous process described herein. By recycling approximately half of the frozen and thawed agglomerated synthetic rubber latex blend from the freezer drum 65, it is possible to improve the mechanical stability of the feed to first stage concentrator 10 to such an extent that only very minor amounts of prefloc are formed in the process, thereby improving the utilization of monomers to a marked extent. It is also possible to use a recipe containing less soap and thus further effect economies. Even more important, it is possible to obtain heretofore unattainable precise control of the latex product viscosity. For example, if a lower viscosity latex product is desired, a larger ratio of frozen and thawed agglomerated synthetic rubber latex is used in preparing the latex blend of the invention, while a more viscous latex product may be produced by using a smaller ratio.

The following specific example further illustrates the invention:

EXAMPLE

This example illustrates an essentially continuous process for agglomerating and concentrating a conventional low solids small average particle size GR–S latex when operating the freezer drum 65 in accordance with the invention.

A GR–S latex (79 parts butadiene—21 parts styrene) was prepared by a conventional "cold rubber" process using the recipe of Table I. The polymerization was short-stopped at 60% conversion and the unreacted monomers removed by conventional flashing and stripping. The resulting small average particle size GR–S latex had a solids content of about 18.1%.

The above original low solids latex after conventional flashing and stripping of unreacted monomers was pumped into storage tank 92 and used in preparing the latex blend in compartment 79. The latex blend prepared in compartment 79 and charged to first stage concentrator 10 via conduit 19, pump 20, conduit 21, heater 22, conduit 23 and inlet 11, was a 50/50 blend by weight and on a dry solids basis of the original fresh low solids small average particle size GR–S latex in storage tank 92 and the frozen and thawed agglomerated GR–S latex having a relatively large average particle size fed to compartment 79 via chute portion 81. The resulting latex blend had a solids content of about 26.6%.

The latex blend was recycled in first stage concentrator 10 until concentrated to 55% TSC. During this concentration step, the concentrator 10 was operated at a temperature of about 120° F., the heat being supplied to the latex blend by means of heater 22, and under 28 inches of mercury vacuum by means of suction on exhaust conduit 12. The vaporized water was withdrawn via exhaust conduit 12. After concentration to 55% TSC, the latex blend was withdrawn from concentrator 10 and passed via conduit 28 to freezer feed tank 29. Practically no prefloc was formed during first stage concentration.

The latex blend was withdrawn from freezer feed tank 29, passed to pump 31 via conduit 30, and then forced by means of pump 31 via conduit 32, precooler 33, and conduit 34 into pH adjustment tank 35. The latex blend was cooled to about 40° F. in precooler 33 by means of indirect heat exchange with the liquid ammonia supplied thereto via conduits 37 and 38. The feed rate in conduit 34 was controlled by means of valve 39 operated by controller 40 as hereinbefore described. The pH of the latex blend feed to tank 35 was 10.0 and carbon dioxide was passed via conduit 46 into the latex blend 44 at a controlled rate and in quantities sufficient to reduce the pH to 8.2. During pH adjustment, the latex blend 44 in tank 35 was agitated by means of agitator 45.

The latex blend after pH adjustment was passed from tank 35 via overflow spout 47 into container 48. The pH of the overflowing latex blend was measured by means of pH electrode 52 immersed in the latex blend 56, with the carbon dioxide feed rate to tank 35 being controlled by means of valve 49 in conduit 46. Valve 49 was operated by pH controller 53 in response to changes in the pH of the latex as hereinbefore described.

The pH adjusted latex blend was allowed to overflow via conduit 51 to freezer drum tank 60 and was agglomerated to a relatively large average particle size by means comprising freezer drum 65. The freezer drum 65 was about 4 feet in diameter and was rotated at about 1 r.p.m. Liquid ammonia was passed through interior 69 of freezer drum 65 and expanded therein under reduced pressure to thereby maintain the temperature of the freezer drum surface 68 at about −27° F. By operating the freezer drum 65 under such conditions, as the drum rotated a film of latex 70 of about 1/16–1/8 inch in thickness was collected by a freezing action on the portion of drum surface 68 immersed in latex 61, and the film of latex so collected was then subcooled upon passing from latex 61 and before reaching scraper blade 71 to a temperature substantially below its freezing point, i.e., substantially below about 28° F. It was found that upon reaching the scraper 71, the portion of the latex film 70 at the drum surface 68 was −27° F. and the top surface was −17° F., the average temperature of latex film 70 being about −22° F. The latex film 70 was completely frozen and embrittled to such an extent as to allow easy removal from drum surface 68 by a scraping action.

The frozen agglomerated latex blend was removed from the freezer drum surface 68 by scraper 71, divided into two equal portions by means of divider blade 74, and guided down surfaces 72 by means of divider blade 74, baffles 75, and chute portions 81 and 82 into compartments 79 and 80, respectively. The frozen agglomerated latex blend was thawed in compartments 79 and 80 by means of steam injected into the contents thereof via conduits 90 and 91, respectively.

A latex blend was prepared in compartment 79 for feeding to first stage concentration by controlling the ratio of feed rates in conduits 34 and 95 with means comprising flow ratio controller 96, which operated valve 97 as previously described. The latex blend contained by weight and on a dry solids basis 50 parts of the frozen and thawed agglomerated latex having a relatively large particle size for each 100 parts of the prepared latex blend. The resulting latex blend was passed to the first stage concentration step.

The frozen and thawed agglomerated latex blend in compartment 80 was passed to pump 110 via conduit 109, and charged to second stage concentrator 101 via conduit 111, heater 112, conduit 113, and inlet 102. The second stage concentrator 101 was operated in the manner of first stage concentrator 10. The frozen and thawed agglomerated latex blend was recycled until a solids content of 60% was reached and then the final product withdrawn via conduit 118. The final product at 60% TSC generally had a viscosity of less than 150 centipoises and exhibited excellent mechanical stability characteristics. When desired, the latex product may be concentrated to 65% TSC, or to an even higher solids content. At 65% TSC, the viscosity was generally less than 845 centipoises.

The amount of prefloc produced in the overall process of this example was very small and was not appreciably greater than when using conventional operating conditions for freezer drum 65, as indicated by a monomer utilization of about 99%. The agglomeration of the latex blend by the freezing step was more effective and resulted in a wide uniform distribution of particle size in addition to a larger average particle size in the frozen and thawed agglometrated latex blend than heretofore possible, when operating at the higher temperature. Thus, the viscosity of the final product was lower and could be controlled more effectively to produce a final product having a lower uniform viscosity than is possible when operating the freezer drum 65 under conventional temperature conditions. Also, the completely frozen latex film was easily removed by the scraper 71 without the usual prior art operating difficulties such as insufficient agglomeration and material handling problems, excess power requirements, and an uneven jerking movement of the freezer drum accompanied by metal fatigue or gouging of the scraper into the freezer drum surface.

What is claimed is:

1. In a process for agglomerating synthetic rubber latex wherein the average particle size is enlarged in the resultant agglomerated latex by steps including freezing and thawing, the improvement comprising subcooling the frozen latex to a temperature between about −10° F. and −40° F., the synthetic rubber latex being selected from the group consisting of latices of rubbery homopolymers of conjugated diolefins and latices of rubery copolymers of conjugated diolefins and monoethylenically unsaturated monomers.

2. In a process for agglomerating latex of a rubbery copolymer of styrene and butadiene wherein the average particle size is enlarged in the resultant agglomerated latex by steps including freezing and thawing, the improvement comprising subcooling the frozen latex to a temperature between about −10° F. and −40° F.

3. In a process for agglomerating synthetic rubber latex wherein the average particle size is enlarged in the resultant agglomerated latex by steps including collecting by a freezing action a film of the latex on a moving surface maintained at a temperature below the freezing point of the latex, removing collected frozen latex film from the moving surface and thawing the frozen latex, the improvement which comprises subcooling collected latex film to a temperature between about −10° F. and −40° F. prior to its removal from the moving surface, the synthetic rubber latex being selected from the group consisting of latices of rubbery homopolymers of conjugated diolefins and latices of rubbery copolymers of conjugated diolefins and monoethylenically unsaturated monomers.

4. In a process for agglomerating latex of a rubbery copolymer of styrene and butadiene wherein the average particle size is enlarged in the resultant agglomerated latex by steps including collecting by a freezing action a film of the latex on a moving surface maintained at a temperature below the freezing point of the latex, removing collected frozen latex film from the moving surface and thawing the frozen latex, the improvement which comprises subcooling collected latex film to a temperature between about −10° F. and −40° F. prior to its removal from the moving surface.

References Cited by the Examiner

UNITED STATES PATENTS

| | | | |
|---|---|---|---|
| 2,187,146 | 1/1940 | Calcott et al. | 260—821 |
| 2,494,002 | 1/1950 | Rumbold | 260—29.7 |
| 2,993,020 | 7/1961 | Carpenter | 260—29.7 |
| 3,031,427 | 4/1962 | Talalay | 260—29.7 |

FOREIGN PATENTS

| | | |
|---|---|---|
| 528,151 | 6/1955 | Italy. |
| 758,622 | 10/1956 | Great Britain. |

(Other references on following page)

OTHER REFERENCES

Maron et al.: Journal of American Chemical Society, vol. 70, pp. 582–7, particularly p. 586, February 1948.

Nobel: "Latex in Industry," 2nd edition, Rubber Age, New York, N.Y. (1953), pp. 143–145.

MURRAY TILLMAN, *Primary Examiner.*
DANIEL ARNOLD, *Examiner.*
P. J. LUCKERN, H. L. SATZ, J. ZIEGLER,
*Assistant Examiners.*